(12) United States Patent
Ji

(10) Patent No.: US 12,738,168 B2
(45) Date of Patent: Sep. 15, 2026

(54) APPARATUS AND METHOD FOR PLATOONING CONTROL

(71) Applicant: HYUNDAI MOBIS CO., LTD., Seoul (KR)

(72) Inventor: Young Kwan Ji, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 117 days.

(21) Appl. No.: 18/237,554

(22) Filed: Aug. 24, 2023

(65) Prior Publication Data

US 2024/0096220 A1 Mar. 21, 2024

(30) Foreign Application Priority Data

Sep. 21, 2022 (KR) ........................ 10-2022-0119456

(51) Int. Cl.
*G08G 1/00* (2006.01)
*B60W 60/00* (2020.01)
*G07C 5/00* (2006.01)

(52) U.S. Cl.
CPC ............. *G08G 1/22* (2013.01); *B60W 60/001* (2020.02); *G07C 5/008* (2013.01); *B60W 2556/45* (2020.02)

(58) Field of Classification Search
CPC .... G08G 1/00; B60W 60/00; B60W 2556/00; B60W 30/00; B60W 40/00; B60W 2050/00; G07C 5/00; G05D 1/00
See application file for complete search history.

(56) References Cited

U.S. PATENT DOCUMENTS 11,162,811 B2 * 11/2021 Cho ..................... G05D 1/0221
2018/0113448 A1 4/2018 Nagda et al.
2018/0211546 A1 7/2018 Smartt et al.
2019/0079540 A1 * 3/2019 Yoon .................... G05D 1/0027
2020/0027355 A1 * 1/2020 Sujan ...................... H04W 4/46
2020/0153494 A1 5/2020 Park et al.
2020/0207371 A1 * 7/2020 Dougherty ........... G05D 1/0293
2020/0371534 A1 * 11/2020 Ji .......................... G05D 1/628
(Continued)

FOREIGN PATENT DOCUMENTS

KR 10-2021-0127021 A 10/2021
KR 10-2021-0130877 A 11/2021

OTHER PUBLICATIONS

Extended European Search Report issued in corresponding European Application No. 23196554.2 dated Feb. 12, 2024.
(Continued)

*Primary Examiner* — Aniss Chad
*Assistant Examiner* — Elizabeth J Slowik
(74) *Attorney, Agent, or Firm* — MORGAN, LEWIS & BOCKIUS LLP

(57) ABSTRACT

Disclosed are a platooning control apparatus and control method, the apparatus including a communication unit obtaining performance information and sensing information of a controller for platooning and a control unit granting at least vehicle among plurality of vehicles platooning control authority based on the performance information and in response to determination that a vehicle in which the control unit is provided is the vehicle to be granted platooning control authority, generating a driving route on the sensing information and controlling the platooning based on the driving route.

13 Claims, 7 Drawing Sheets

(56) References Cited

U.S. PATENT DOCUMENTS

| | | | | |
|---|---|---|---|---|
| 2021/0118293 | A1* | 4/2021 | Yi | G08G 1/012 |
| 2021/0172749 | A1* | 6/2021 | Shin | G05D 1/0291 |
| 2021/0181762 | A1* | 6/2021 | Zhao | G05D 1/227 |
| 2021/0366288 | A1* | 11/2021 | Kim | B60W 30/165 |
| 2021/0370973 | A1 | 12/2021 | Kazuyuki | |
| 2021/0382492 | A1 | 12/2021 | Park | |
| 2021/0398432 | A1* | 12/2021 | Bae | G05D 1/02 |
| 2022/0082395 | A1* | 3/2022 | Sasaki | H04W 4/46 |
| 2022/0198936 | A1* | 6/2022 | Meriçli | B60W 30/18163 |
| 2022/0198937 | A1* | 6/2022 | Meriçli | G05D 1/69 |
| 2022/0284818 | A1* | 9/2022 | Kwak | G05D 1/02 |
| 2023/0069005 | A1* | 3/2023 | Oyanagi | B60W 30/165 |
| 2024/0220924 | A1* | 7/2024 | Hazan | G06Q 10/0631 |

OTHER PUBLICATIONS

Office Action dated Dec. 9, 2024, issued in corresponding European Patent Application No. 23196554.2.

Communication under Rule 71(3) EPC issued in corresponding European Application No. 23 196 554.2 issued May 26, 2025.

* cited by examiner

APPARATUS AND METHOD FOR PLATOONING CONTROL

CROSS REFERENCE TO RELATED APPLICATION

The present application claims priority to Korean Patent Application No. 10-2022-0119456, filed on Sep. 21, 2022, the entire contents of which is incorporated herein for all purposes by this reference.

TECHNICAL FIELD

The present disclosure relates to a platooning control apparatus platooning, and more particularly, to a platooning control apparatus for controlling platooning based on the performance of a controller for platooning provided in each platooning vehicle.

BACKGROUND

In recent years, vehicles have been equipped with various sensors and electronic devices for the convenience of vehicle users. In particular, research and development of advanced driver assistance systems (ADAS) and autonomous vehicles have been actively conducted to enhance the driving convenience of users.

With the advancement of vehicle-to-vehicle communication and autonomous driving technologies, platooning technology has emerged. Generally, platooning refers to a plurality of vehicles grouped driving on roads while sharing driving information with each other and considering the external environment.

A platoon consists of a leader vehicle and follower vehicles. The leader vehicle is typically at the forefront of the platoon to lead the platoon. The leader vehicle may perform platooning control utilizing information received through vehicle-to-vehicle communication or information collected through sensors installed in the vehicle. Follower vehicles follow the leader vehicle and may be referred to as trailing vehicles. The follower vehicles may obtain driving information of the leader vehicle through vehicle-to-vehicle communication and the like and follow the leader vehicle using the information.

On the other hand, the leader vehicle controls the entire platoon and may experience overload due to excessive control processing. Overload may lead to malfunctions, and in particular, malfunctions of the leader vehicle may cause significant damage to the entire platoon. Therefore, it is necessary to provide ways to perform platoon control efficiently.

The matters described above as background technology are intended to provide a better understanding of the background of the present disclosure and should not be considered as acknowledging that the present disclosure pertains to the prior art already known to those skilled in the art.

SUMMARY DISCLOSURE

An object of the present disclosure is to provide a platooning control apparatus that allows the efficient performance of platooning control.

The technical issues that the present disclosure intends to resolve are not limited to the technical issues mentioned above, and other technical issues not mentioned will be clearly understood by those skilled in the art to which the present disclosure pertains from the following description.

According to an embodiment of the present disclosure, a platooning control apparatus includes a communication unit obtaining, from at least one other vehicle in a platoon formation including a plurality of vehicles, performance information and sensing information of a controller for platooning provided in the at least one other vehicle and a control unit determining a vehicle to be granted platooning control authority among the plurality of vehicles based on the performance information and generating a driving route based on the sensing information and controlling the platooning based on the driving route when the vehicle to be granted the control authority is the vehicle of the control unit.

For example, the control unit may determine the rating information for each of the plurality of vehicles based on the preset rating criteria established on the performance information and autonomous driving function and determine a vehicle to be granted control authority based on the rating information.

For example, the performance information may include first information about the hardware performance of the controller, second information about the software information of the controller, and third information about the performance of sensors connected to the controller.

For example, the control unit may first consider the first information and then consider the second information an alternative in determining the vehicle to be granted the control authority.

For example, the control unit may determine the priority order among the plurality of vehicles based on the performance information and determine the vehicle to be granted the control authority based on the priority.

For example, the control unit may determine a vehicle ranking first in the priority order to be the vehicle to be granted the control authority.

For example, when a plurality of vehicles ranks first, the control unit may determine the vehicle to be granted the control authority in further consideration of the platoon formation.

For example, the communication unit may obtain drive setting information of a driver from at least one other vehicle, and the control unit may determine the priority order in further consideration of the drive setting information.

For example, the drive setting information may include whether platooning and autonomous driving functions are activated.

For example, the control unit may determine at least two vehicles to be granted the control authority among the plurality of vehicles when the vehicle ranking first in the priority order does not meet a preset performance condition based on the performance information.

For example, the control unit may determine the distribution of the control authority such that the at least two vehicles to be granted the control authority share and perform the control for the platooning.

For example, the control unit may determine a vehicle that departs from the platoon formation by meeting a preset departure condition based on the performance information among the plurality of vehicles.

For example, the control unit may obtain information about the normal operating status of the controller and the drive setting information of the driver from the at least one other vehicle, and whether the departure condition is met may be determined based on at least either of the normal operating status of the controller and the drive setting information of the driver.

For example, when the vehicle that meets the departure condition based on the performance information is the vehicle to be granted the control authority, the control unit may determine at least one vehicle to transfer the control authority among the rest of the vehicles based on the performance information.

For example, the control unit may determine a vehicle to be granted the control authority in further consideration of the difficulty of the driving route.

For example, when the vehicle to be granted the control authority is the vehicle of the control unit, the control unit may determine the arrangement in the platoon formation of the plurality of vehicles based on the performance information.

According to an embodiment of the present disclosure, a platooning control method includes obtaining by a communication unit, from at least one other vehicle in a platoon formation including a plurality of vehicles, performance information and sensing information of a controller for platooning provided in the at least one other vehicle, determining by a control unit a vehicle to be granted platooning control authority among the plurality of vehicles based on the obtained performance information, and generating a driving route based on the sensing information, and controlling the platooning based on the generated driving route by the control unit when the vehicle to be granted the control authority is the vehicle of the control unit.

For example, the determination of a vehicle to be granted the control authority may include determining a priority order of the plurality of vehicles based on the performance information by the control unit and determining a vehicle to be granted the control authority based on the priority order by the control unit.

For example, the determination of a vehicle to be granted the control authority when the vehicle ranking first in the priority order does not meet a preset performance condition based on the performance information may include determining by the control unit at least two vehicles to be granted the control authority among the plurality of vehicles.

The determination, by the control unit, of a vehicle that departs from the platoon formation by meeting a preset departure condition based on the performance information may be further included.

The issues of the present disclosure are not limited to the issues mentioned above, and other issues not mentioned will be clearly understood by those skilled in the art from the following description.

According to various embodiments of the present disclosure as described above, platooning control can be efficiently and reliably performed by granting the platooning control authority in consideration of the control performance of each of a plurality of platooning vehicles during platooning control.

The effects obtainable from the present disclosure are not limited to the effects mentioned above, and other effects not mentioned will be clearly understood by those skilled in the art from the following description.

DETAILED DESCRIPTION

Figure 1:
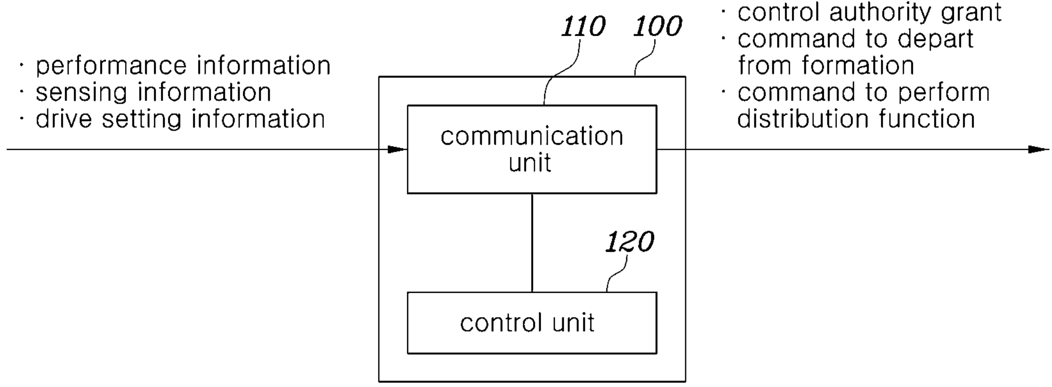
FIG. 1 shows an example of a configuration of a platooning control apparatus according to an embodiment of the present disclosure.

Specific structural or functional descriptions of the embodiments of the present disclosure disclosed herein or the application are presented only for the purpose of describing embodiments of the present disclosure, and the present disclosure may be implemented as various embodiments which should not be construed as limited to the embodiments described herein or the application.

Since the embodiments according to the present disclosure may be subjected to various modifications and may assume many forms, specific embodiments will be illustrated in the drawings and described in detail herein or the application. However, this is not intended to limit embodiments according to the concept of the present disclosures to particular disclosure forms and should be understood to include all modifications, equivalents, and substitutes included in the scope of ideas and technology of the present disclosure.

Unless defined otherwise, all terms used herein, including technical or scientific terms, have the same meaning as commonly understood by those with ordinary skill in the art to which the present disclosure pertains. Terms such as those defined in commonly used dictionaries should be construed as having a meaning consistent with the meaning in the context of the related art and are not to be construed in an ideal or overly formal meaning unless explicitly defined herein.

The embodiments disclosed herein will be described in detail with reference to the accompanying drawings. However, the same or similar components will be given the same reference numerals regardless of the drawing numbers, and the repetitive descriptions regarding these components will be omitted.

The suffixes "module" and "unit" for the components used in the following description are given or interchangeably used only to facilitate the writing of the specification, without necessarily indicating a distinct meaning or role of their own.

when it is determined that the specific description of the related and already known technology may obscure the essence of the embodiments disclosed herein, the specific description will be omitted. Further, it is to be understood that the accompanying drawings are only intended to facilitate understanding of the embodiments disclosed herein and are not intended to limit the technical ideas disclosed herein are not limited to the accompanying drawings and include all the modifications, equivalents, or substitutions within the spirit and technical scope of the present disclosure.

The terms including ordinal numbers such as first, second, and the like may be used to describe various components, but the components are not to be limited by the terms. The terms may only be used for the purpose of distinguishing one component from another.

It is to be understood that when a component is referred to as being "connected" or "coupled" to another component, the component may be directly connected or coupled to the another component, but other components may be interposed therebetween. In contrast, it is to be understood that when a component is referred to as being "directly connected" or "directly coupled" to another component, no other component is interposed therebetween.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of one or more of other features, numbers, steps, manipulations, components, parts or combinations thereof.

In addition, a unit or a control unit included in the names such as a motor control unit (MCU), a hybrid control unit (HCU), and the like is a term widely used in the naming of controllers that control specific functions of a vehicle and does not mean a generic function unit.

A controller may include a communication device that communicates with other controllers or sensors to control functions it is charged with, a memory for storing an operating system, logic commands, input and output information, and the like, and one or more processors performing functions such as decision-making, calculation, determination, and the like required for controlling the functions it is charged with.

An embodiment of the present disclosure proposes to determine a vehicle to be granted platooning control authority based on the controller performance of each vehicle forming a platoon formation so that platooning is controlled efficiently and reliably.

First, a platooning control apparatus that allows efficient and reliable platooning control according to an embodiment will be described with reference to FIG. 1.

FIG. 1 shows an example of a configuration of a platooning control apparatus according to an embodiment of the present disclosure.

FIG. 1 shows that the platooning control apparatus according to an embodiment includes a communication unit 110 and a control unit 120. However, FIG. 1 highlights components related to embodiments of the present disclosure, and more configurations may be included.

The communication unit 110 may perform vehicle-to-vehicle communication with at least one other vehicle in a platooning formation including a plurality of vehicles to obtain information for platooning. To this end, the communication unit 110 may be a hardware device implemented as various electronic circuits to transmit and receive signals through wireless or wired connections. In this case, communications between a plurality of vehicles may be carried out by vehicle-to-everything (V2X) communication, and in particular, it may be referred to as vehicle-to-vehicle (V2V) communication when it comes to communication between vehicles. In this case, the communication unit 110 may perform V2V communication using technologies such as wireless internet access or short-range communication. Wireless internet technologies may include wireless LAN, wireless Broadband, Wi-Fi, and World Interoperability for Microwave Access (WiMax), while short-range communication technologies may include Bluetooth, Ultra-Wideband (UWB), and Infrared Data Association (IrDA). However, communication between a plurality of vehicles is not necessarily limited to these methods, and may also be performed by other methods, such communicating through a separate server.

According to an exemplary embodiment of the present disclosure, the communication unit 110 may include a processor (e.g., computer, microprocessor, CPU, ASIC, circuitry, logic circuits, etc.) and an associated non-transitory memory storing software instructions which, when executed by the processor, provides the functionalities of the communication unit 110. Herein, the memory and the processor may be implemented as separate semiconductor circuits. Alternatively, the memory and the processor may be implemented as a single integrated semiconductor circuit. The processor may embody one or more processor(s).

On the other hand, information for platooning may include performance information of a controller for platooning provided in each of a plurality of vehicles, sensing information of each vehicle, drive setting information of a driver of each vehicle, and the like. The communication unit 110 transmits and receives such information and delivers the information to the control unit 120 so that the control unit 120 may perform platooning controls such as driving route generation, platoon formation arrangement, control authority grant/transfer, and the like.

The control unit 120 controls platooning based on the information received from the communication unit 110. In particular, the control unit 120 may determine at least one vehicle to be granted platooning control authority among a plurality of vehicles in the platoon formation based on the performance information and may generate a driving route based on the sensing information and perform platooning based thereon. Further, the control unit 120 may grant control authority according to the determination of the vehicle to be granted the control authority.

First, the control unit 120 may determine rating information for each of a plurality of vehicles based on classification criteria preset for performance information and autonomous driving function and may determine a vehicle to be granted the control authority based on the determined rating information. For example, the preset classification criteria may be based on the level of autonomous driving, the installation status of the ADAS, and the like, and the rating information about the performance information may be evaluated for each controller, such that vehicles capable of platooning and autonomous driving are classified as class 1, vehicles capable of autonomous driving of level 3 or higher without platooning capability are classified as class 2, vehicles capable of the autonomous driving capability of level 2 or lower or with ADAS function alone are classified as class 3, and so on. In addition, the control unit may determine it advantageous to be granted control authority to the vehicle with the highest rating according to the rating information and grant the control authority to the vehicle with the highest rating.

In addition, the control unit 120 may determine the priority order between multiple vehicles in the platoon formation and determine at least one vehicle to be granted control authority based on the priority order. In this case, the rating information described above may be used for priority determination. The control unit 120 may grant control authority to the vehicle ranking first in the priority order, and may grant control authority in further consideration of the platoon formation when there are more than one first-ranking vehicles. For example, the control unit 120 may grant control authority to the vehicle ranking first according to the performance information but may grant control authority to the vehicle at the forefront of the platoon formation when there is more than one first-ranking vehicle. By granting control authority to the vehicle with the best control performance for platooning and at the forefront of the formation (i.e., the leader vehicle), efficient platooning control such as generating a driving route by first collecting information about the front environment while reliably performing platooning control based on the high performance may be possible.

On the other hand, the control unit 120 may further consider the drive setting information of a driver in determining the priority. The drive setting information of a driver may include whether the platooning and autonomous driving functions are activated, and thus the intention of each driver may be reflected in the platooning control. For example, the drive setting information may include a first option in which platooning and autonomous driving functions are fully deactivated, a second option in which only longitudinal control or lateral control function is activated, and a third option in which platooning and autonomous driving functions are fully activated. In addition, the control unit 120 may consider the drive setting information in granting the control authority. The control unit 120 may not grant the control authority even to the vehicle ranking first in the priority order according to the performance information when the first option is set in the vehicle.

In addition, the control unit 120 may determine at least two vehicles to be granted the control authority among a plurality of vehicles in the platoon when the vehicle ranking first in the priority order does not meet the preset performance condition based on the performance information. In this manner, control overload in the leader vehicle caused by exclusive control when the control performance is insufficient may be prevented. For example, whether the performance condition is met may be determined using the rating information described above, and the control authority may be shared and granted to a plurality of vehicles when the first-ranking vehicle fails to fall into class 1. Further, in this case, the control unit 120 may determine the distribution of the control authority such that at least two vehicles to be granted the control authority share and perform control for platooning. For example, when three vehicles share the control authority, the control unit 120 may distribute the functions such as sensing information processing, route generation, and driving control respectively to each vehicle and transmit commands to each vehicle to perform the distributed functions through the communication unit 110 so that each vehicle may perform the shared control for platooning.

In addition, the control unit 120 may determine a vehicle that departs from the platoon formation by meeting a preset departure condition based on the performance information among the plurality of vehicles. In this case, whether the departure condition is met may be determined based on at least either of the normal operating status of the controller 200 for platooning and the drive setting information of a driver. For example, when the platooning and autonomous driving functions are fully deactivated according to the drive setting of a driver (first option described above), the vehicle may be determined to meet the departure condition if the controller 200 is in an abnormal operating state such as a malfunctioning state. In addition, the control unit 120 may transmit commands to the vehicle that departs from the platoon formation by meeting the departure condition through the communication unit 110 so that the vehicle may depart from the platooning formation.

When the vehicle that meets the departure condition based on the performance information is the vehicle to which the control authority is granted, the control unit 120 may determine at least one vehicle to transfer the control authority among the rest of the vehicles in the platoon formation based on the performance information.

On the other hand, the control unit 120 may determine the vehicle to be granted the control authority in further consideration of the difficulty of the driving route. For example, when the difficulty of the driving route is determined to be high, the control unit 120 may grant the control authority to multiple vehicles instead of one vehicle monopolizing the control authority to perform exclusive control to improve performance conditions, so that the platooning control is shared and performed by a plurality of vehicles and thus the control load on vehicles with control authority is reduced.

In addition, when the vehicle to be granted the control authority is the vehicle of the control unit 120, the control unit 120 may generate a driving route based on sensing information and serve as a leader vehicle by controlling the platooning and the like. The control unit 120 may also determine the arrangement in the platooning formation, and the arrangement in the platooning formation may be determined based on performance information. For example, the arrangement in platooning formation may be determined such that the first-ranking vehicle according to the performance information is positioned at the forefront of the platooning formation, followed by the vehicle ranking next.

On the other hand, according to an embodiment of the present disclosure, the platooning control apparatus 100 may be implemented inside the vehicle and may be implemented as a function of a controller 200 inside the vehicle for platooning described below. The apparatus may also be implemented as a separate apparatus to be connected to a controller of the vehicle by a separate device.

A controller for platooning and performance information thereof will be described with reference to FIG. 2 below.

Figure 2:
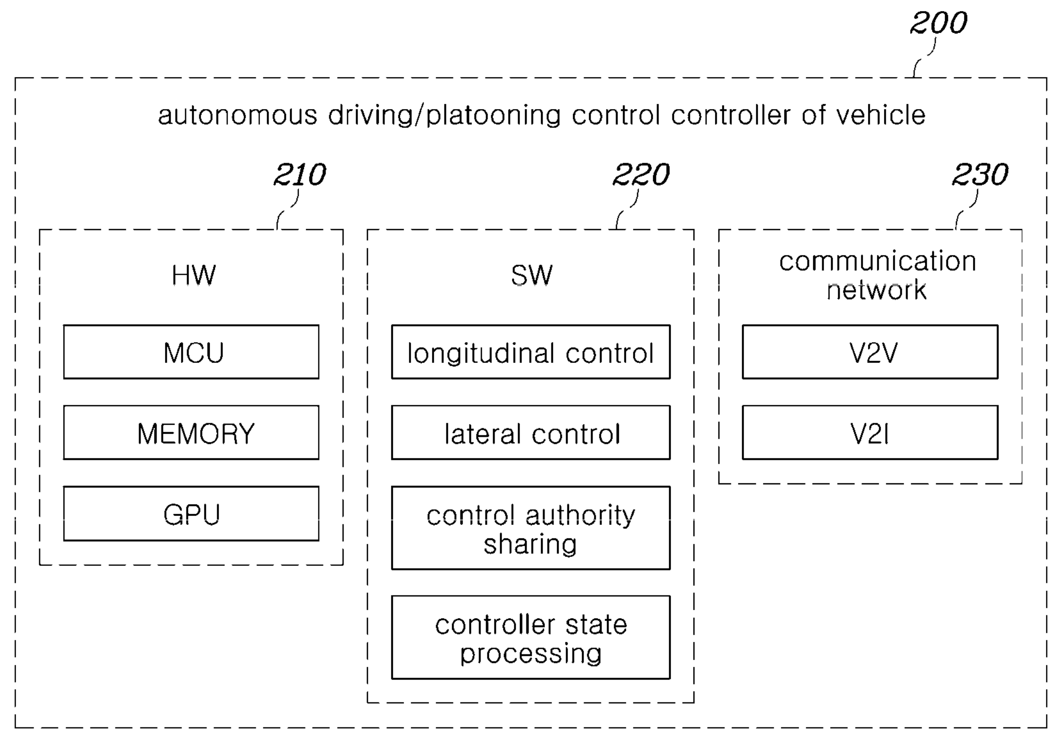
FIG. 2 shows an example of a controller for platooning applicable to embodiments of the present disclosure.

FIG. 2 shows an example of a controller for platooning applicable to various embodiments.

FIG. 2 shows that the controller 200 for platooning may include a hardware (HW) 210 such as a microcontroller unit (MCU), a memory, a graphics processing unit (GPU), and the like, a software (SW) 220 performing longitudinal control, lateral control, control authority sharing, controller state processing, and the like, and a communication network 230 such as V2V and vehicle-to-load (V2L). However, this is an illustrative example, and the configuration and performance of the controller 200 are not necessarily limited thereto. According to an exemplary embodiment of the present disclosure, the controller 200 may include a processor (e.g., computer, microprocessor, CPU, ASIC, circuitry, logic circuits, etc.) and an associated non-transitory memory storing software instructions which, when executed by the processor, provides the functionalities of the controller 200. Herein, the memory and the processor may be implemented as separate semiconductor circuits. Alternatively, the memory and the processor may be implemented as a single integrated semiconductor circuit. The processor may embody one or more processor(s).

The performance information of the controller 200 as described above may include first information about the performance of the hardware 210, second information about the software 220, and third information about the performance of sensors connected to the controller 200. The first and second information may include autonomous driving levels, whether the ADAS function can be performed, and the like, and in particular, the second information may include the update status of the software 220. On the other hand, the sensor connected to the controller 200 may include radar, a camera, a lidar, and the like, and the respective sensors may be provided at the front, rear, and side of the vehicle to sense the external environment and collect information for platooning and autonomous driving. The third information may include the attachment positions of the sensors and the number of attached sensors.

In addition, the control unit 120 may reflect the relative importance of the first to third information and differentially consider each piece of information in granting the control authority based on the performance information. For example, the first information may be considered first and the second information may be considered an alternative to grant the control authority.

Platooning control processes when control authority is monopolized and when control authority is shared will be described with reference to FIGS. 3A To 4B below.

Figure 3A:
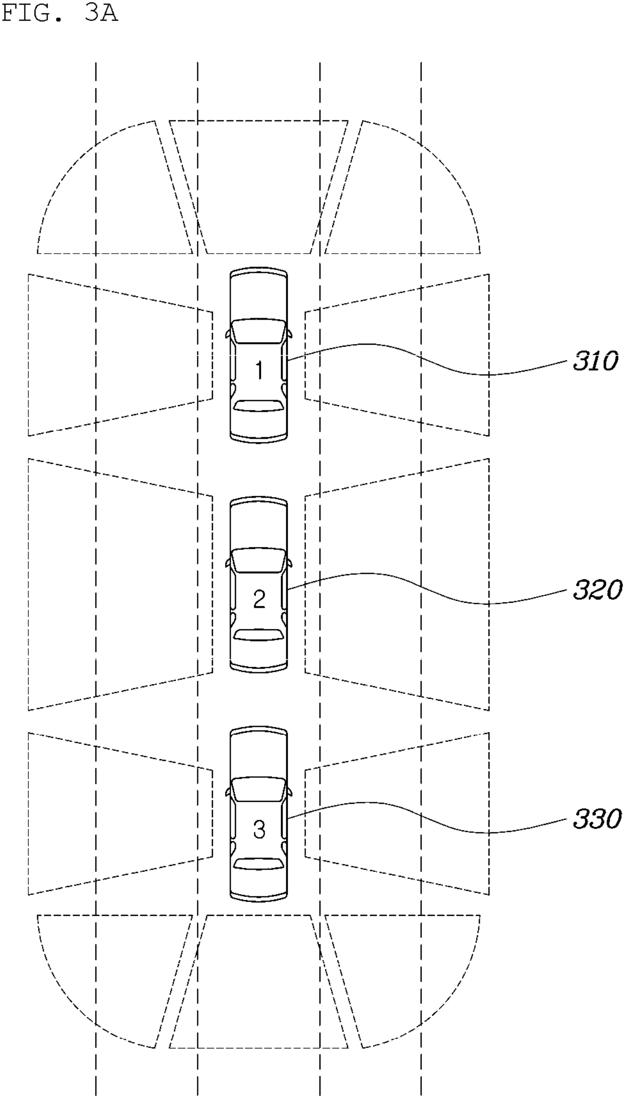
FIGS. 3A and 3B are views showing platooning control when control authority is monopolized according to an embodiment of the present disclosure.
Figure 3B:
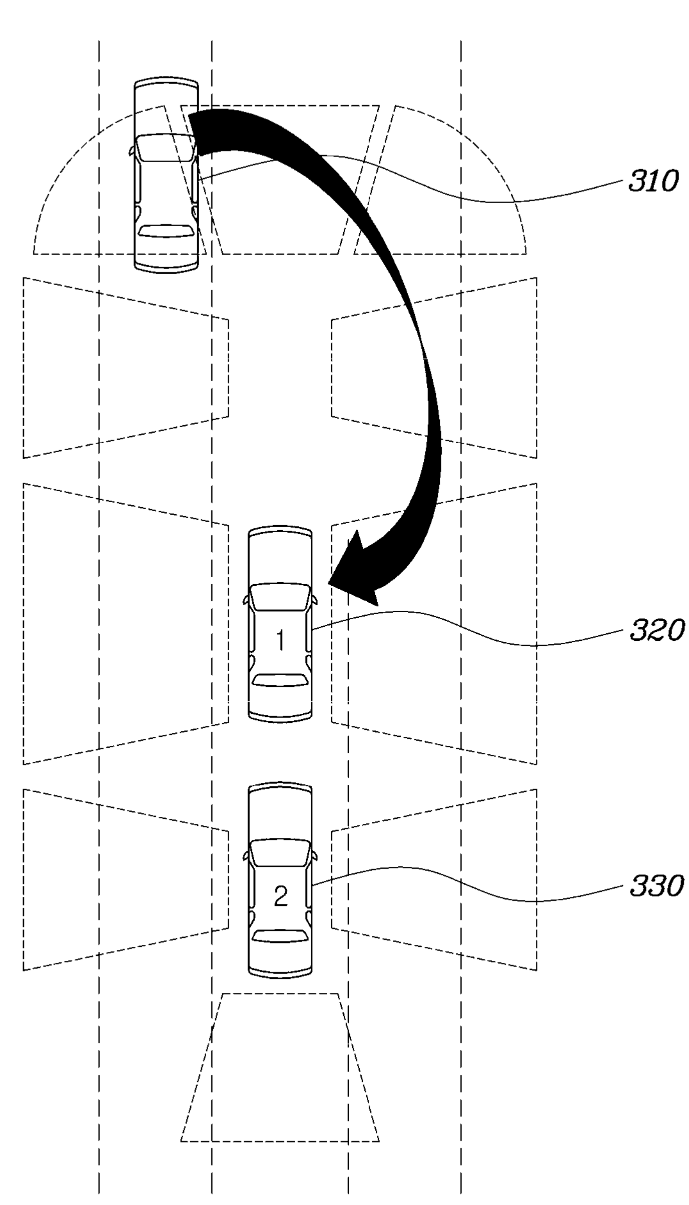

FIGS. 3A and 3B are views showing platooning control when the control authority is monopolized according to an embodiment of the present disclosure.

First, FIG. 3A shows vehicle no. 1 310 ranking first in the priority order followed by vehicles no. 2 and no. 3 320, 330 ranking second and third in the priority order based on performance information. In this case, when the vehicle no. 1 310 meets the performance condition based on the performance information, the control unit 120 grants exclusive control authority to the vehicle no. 1 to monopolize the control authority. Accordingly, the vehicle no. 1 310 becomes the sole leader vehicle and controls the entire platooning.

On the other hand, FIG. 3B shows that the control unit 120 causes the vehicle no. 1 310 to depart from the platoon formation when the departure condition is met by a change in the drive setting of a driver or a failure of the controller 200 in the vehicle no. 1 310 during platooning. As the first-ranking vehicle 310 departs, the control unit 120 transfers control authority, and in this case, the vehicle no. 2 ranking next takes control authority, and platooning control is performed according to the control of the vehicle no. 2.

Figure 4A:
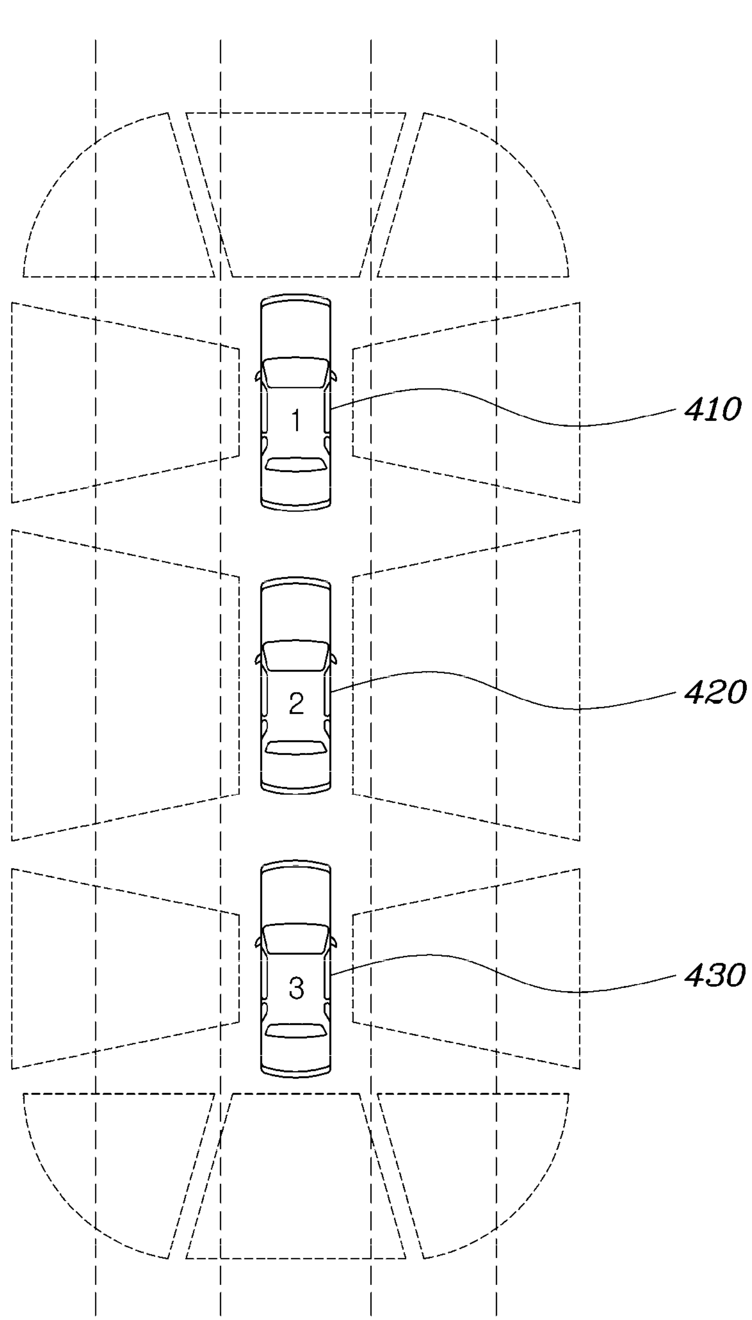
FIGS. 4A and 4B are views showing platooning control when control authority is shared according to an embodiment of the present disclosure.
Figure 4B:
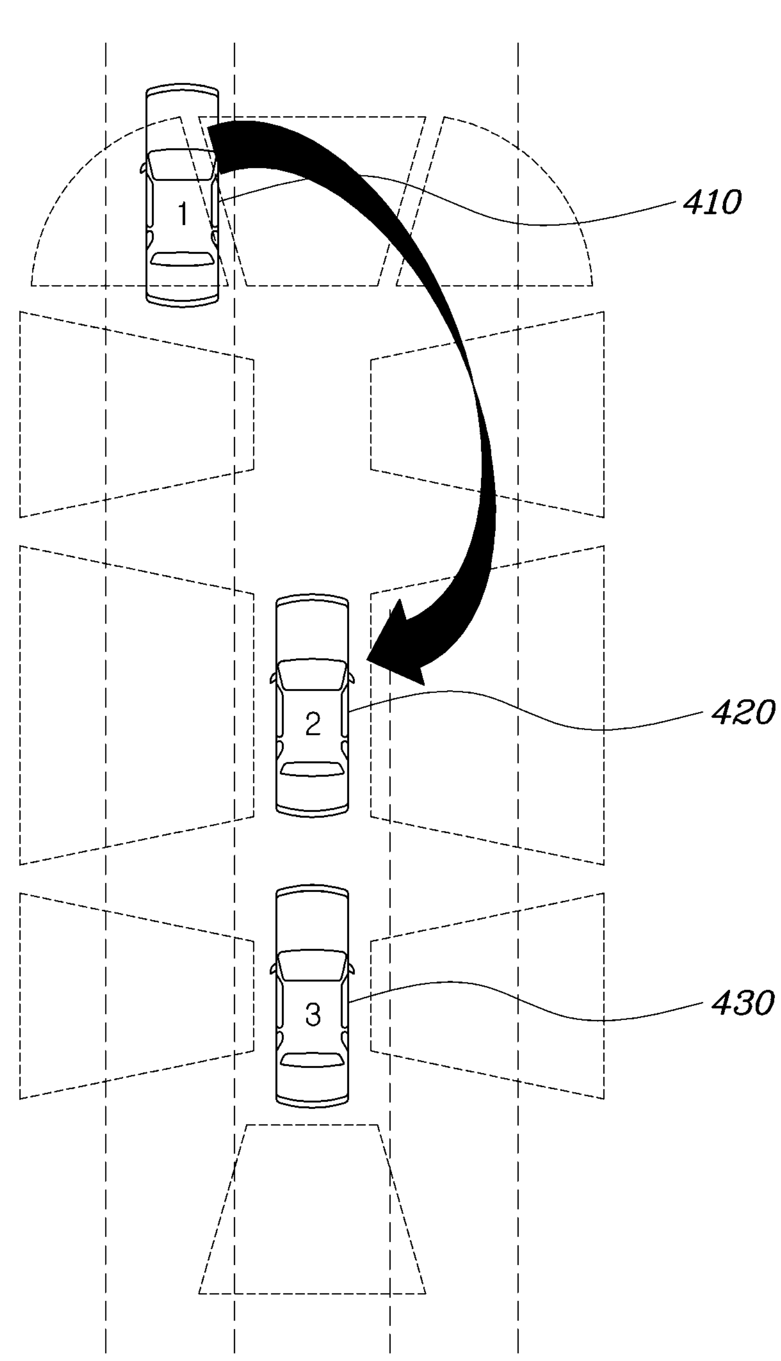

FIGS. 4A and 4B are views showing platooning control when the control authority is shared according to an embodiment of the present disclosure. Unlike FIGS. 3A and 3B, FIGS. 4A and 4B are views showing a case where the first-ranking vehicle 410 fails to meet the performance condition, and a plurality of vehicles 410, 420, 430 share the control authority.

First, FIG. 4A shows that platooning control may be shared and performed by the vehicle no. 1 410 performing the driving control, vehicle no. 2 performing the sensing information processing, and vehicle no. 3 generating a driving route.

On the other hand, FIG. 4B shows that the control unit 120 may redistribute functions to each vehicle having the control authority instead of transferring the control authority when the vehicle no. 1 410 meets the departure conditions during platooning and departs from the platooning formation. For example, the functions may be redistributed such that the vehicle no. 2 420, the controller 200 of which has better performance for platooning, performs both the route generation and driving control while the vehicle no. 3 430 performs the remaining function of the sensing information processing.

Figure 5:
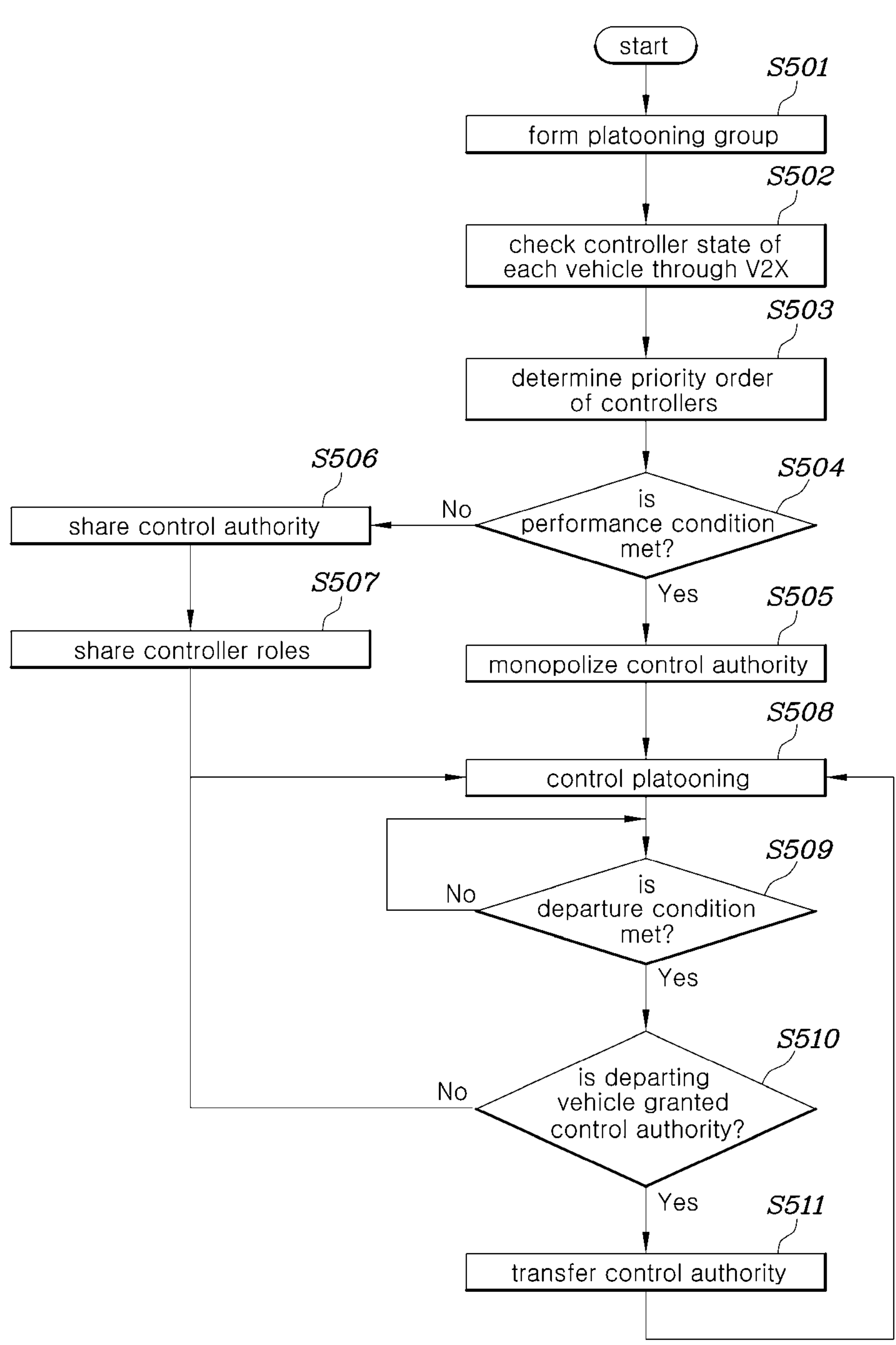
FIG. 5 is a flowchart showing an example of a platooning control process according to an embodiment of the present disclosure.

A flowchart representation of the platooning process described thus far is shown in FIG. 5.

FIG. 5 is a flowchart showing an example of platooning process according to an embodiment of the present disclosure.

FIG. 5 shows that when a plurality of vehicles capable of platooning gathers to form a platoon (S501), the communication unit 110 obtains information about the performance information and normal operating status of the controllers 200 provided in at least one other vehicle in the platoon through V2X communication or the like and checks the state of each vehicle's controller 200 (S502). The control unit 120 receives the information from the communication unit 110 and determines the priority among the vehicles based on the performance information (S503).

In this case, when the vehicle ranking first in the priority order based on the performance information meets a preset performance condition (S504), the control unit 120 grants control authority to the vehicle to monopolize the control authority. However, when the first-ranking vehicle fails to meet the preset performance condition (No in S504), the control unit 120 may grant control authority to a plurality of vehicles in the platoon to share the control authority (S506). In this case, the control unit 120 may distribute the platooning control functions to each vehicle having the control authority (S507), and this allows a plurality of vehicles to share and perform the platooning control. Subsequently, a vehicle having the control authority becomes the leader vehicle and controls the entire platooning (S508).

On the other hand, when a vehicle among a plurality of vehicles in the platoon fails to meet the preset departure condition during platooning, the control unit 120 causes the vehicle to depart from the platooning formation (Yes in S509). When the vehicle departing from the platooning formation has the control authority (Yes in S510), the control authority needs to be reassigned and the control unit 120 grants the control authority to the rest of the vehicles again based on the performance information (S511).

According to the various embodiments of the present disclosure as described above, the platooning control authority is granted during platooning control in consideration of the control performance of each of the plurality of platooning vehicles so that the platooning control may be efficiently and reliably performed.

Specific embodiments of the present disclosure have been illustrated and described, but it will be apparent to those skilled in the art that the present disclosure may be variously improved upon and modified within the scope not departing from the technical spirit of the present disclosure provided by the following claims.

What is claimed is:

1. A platooning control method comprising:

obtaining by a processor, from at least one other vehicle in a platooning formation including a plurality of vehicles, performance information and sensing information of another controller for platooning provided in each of at least one other vehicle;

determining by a controller a vehicle to be granted platooning control authority among the plurality of vehicles based on the performance information, including:

determining a priority order of the plurality of vehicles based on the performance information by the controller;

determining the vehicle to be granted the control authority as a first priority vehicle based on the priority order by the controller; and automatically determining, by the controller, at least two vehicles to be shared and granted the control authority among the plurality of vehicles when the first priority vehicle according to the priority order does not meet a preset performance condition based on performance information of the first priority vehicle and distributing functions for platooning to each of the at least two vehicles such that the at least two vehicles perform a shared control for the platooning, the functions including sensing information processing, route generation processing and driving control process, wherein the at least two vehicles include the first priority vehicle and at least one vehicle having a lower priority order than the first priority vehicle; and in response to determination that a vehicle in which the controller is provided is the vehicle to be granted platooning control authority, generating a driving route based on the sensing information and controlling the platooning based on the generated driving information by the controller, wherein the performance information includes first information about hardware performance of the another controller, second information about software performance of the another controller, and third information about performance of sensors connected to the another controller.

2. The platooning control method of claim 1, further comprising determining, among the plurality of vehicles, a vehicle of which performance information meets a preset departure condition as a vehicle that departs from the platooning formation.

3. A platooning control apparatus comprising:

a processor configured to obtain, from at least one other vehicle in a platoon formation including a plurality of vehicles, performance information and sensing information of another controller for platooning provided in each of the at least one other vehicle; and a controller configured to determine a vehicle to be granted platooning control authority among the plurality of vehicles based on the performance information and in response to determination that a vehicle in which the controller is provided is the vehicle to be granted platooning control authority, by determining a priority order of the plurality of vehicles based on the performance information, determining the vehicle to be granted the control authority as a first priority vehicle based on the priority order, wherein the controller automatically determines at least two vehicles to be shared and granted the control authority among the plurality of vehicles when the first priority vehicle does not meet a preset performance condition based on the performance information, and distributes functions for platooning to each of the at least two vehicles such that the at least two vehicles perform a shared control for the platooning, the functions including sensing information processing, route generation processing and driving control processing, wherein the at least two vehicles include the first priority vehicle and at least one vehicle having a lower priority order than the first priority vehicle, and generates a driving route based on the sensing information and controls the platooning based on the driving route, wherein the performance information includes first information about hardware performance of the another controller, second information about software performance of the another controller, and third information about performance of sensors connected to the another controller.

4. The platooning control apparatus of claim 3, wherein the controller is configured to determine rating information for each of the plurality of vehicles based on predetermined classification criteria established on the performance information and autonomous driving function and determines the vehicle to be granted the control authority based on the rating information.

5. The platooning control apparatus of claim 3, wherein the controller is configured to apply the first information as a primary priority and then applies the second information as a secondary priority in determining the vehicle to be granted the control authority among the plurality of vehicles based on the performance information.

6. The platooning control apparatus of claim 3, wherein when a plurality of first priority vehicles is determined according to the priority order, the controller is further configured to determine a vehicle among the plurality of first priority vehicles as a vehicle to be granted the control authority based on the platoon formation.

7. The platooning control apparatus of claim 3, wherein the processor is configured to obtain drive setting information of a driver from at least one other vehicle, and the controller is configured to determine the priority order based on the drive setting information.

8. The platooning control apparatus of claim 7, wherein the drive setting information includes whether platooning and autonomous driving functions are activated.

9. The platooning control apparatus of claim 3, wherein the controller is configured to determine, among the plurality of vehicles, a vehicle of which performance information meets a preset departure condition as a vehicle that departs from the platooning formation.

10. The platooning control apparatus of claim 9, wherein the processor is configured to obtain information about a normal operating status of the another controller and drive setting information of a driver from each of the at least one other vehicle, and the controller is configured to determine whether performance information of each of the plurality of vehicles meets the preset departure condition based on one of the normal operating status of the another controller, the drive setting information of the driver and combination thereof.

11. The platooning control apparatus of claim 9, wherein when the vehicle of which performance information meets the preset departure condition is the vehicle to be granted the control authority, the controller is configured to determine at least one vehicle to transfer the control authority among the rest of the vehicles based on performance information of the rest of the vehicles.

12. The platooning control apparatus of claim 3, wherein the controller is configured to determine the vehicle to be granted control authority based on difficulty of the driving route.

13. The platooning control apparatus of claim 3, the controller is configured to determine an arrangement in platooning formation of the plurality of vehicles based on the performance information when the vehicle to be granted the control authority is the vehicle in which the controller is provided.

* * * * *